United States Patent
Pajukoski et al.

(10) Patent No.: US 9,642,119 B2
(45) Date of Patent: May 2, 2017

(54) RESOURCE ALLOCATION IN A WIRELESS COMMUNICATION SYSTEM

(75) Inventors: Kari Pekka Pajukoski, Oulu (FI); Esa Tapani Tiirola, Kempele (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 283 days.

(21) Appl. No.: 13/992,041

(22) PCT Filed: Dec. 8, 2010

(86) PCT No.: PCT/EP2010/069142
§ 371 (c)(1),
(2), (4) Date: Aug. 30, 2013

(87) PCT Pub. No.: WO2012/076043
PCT Pub. Date: Jun. 14, 2012

(65) Prior Publication Data
US 2013/0343316 A1    Dec. 26, 2013

(51) Int. Cl.
*H04W 16/10* (2009.01)
*H04W 72/04* (2009.01)
(Continued)

(52) U.S. Cl.
CPC .......... *H04W 72/04* (2013.01); *H04L 5/0048* (2013.01); *H04L 5/0073* (2013.01); *H04W 16/10* (2013.01);
(Continued)

(58) Field of Classification Search
None
See application file for complete search history.

(56) References Cited

U.S. PATENT DOCUMENTS

2006/0269006 A1* 11/2006 Kuroda ............... H04L 25/0202
375/260
2008/0310540 A1* 12/2008 Tiirola .................... H04J 13/00
375/267
(Continued)

FOREIGN PATENT DOCUMENTS

CN  WO 2010108424 A1 *  9/2010 .......... H04L 5/0035
EP     2 139 256 A1    12/2009
(Continued)

OTHER PUBLICATIONS

3GPP TSG RAN WG1 Meeting #63, Jacksonville, USA, Nov. 15-19, 2010, R1-105857, "PUCCH Format 3 Resourc Selection", Ericsson, ST-Ericsson, 5 pgs.

*Primary Examiner* — Shaq Taha
*Assistant Examiner* — Manuel Rangel
(74) *Attorney, Agent, or Firm* — Harrington & Smith

(57) ABSTRACT

The disclosure relates to a method and apparatus for allocating resources for wireless communication. In the method orthogonal resources are allocated for signalling within a coordination area including at least two radio service areas based on a first resource pattern. Orthogonal data communication resources are allocated within a radio service area of the coordination area based on a second resource pattern. A communication device can receive signalling indicating the allocation of the orthogonal resources for signalling within the coordination area and the allocation of orthogonal data communication resources within the radio service area, and transmit signalling and data accordingly.

42 Claims, 5 Drawing Sheets

| Allocation index i | OCC index for data communication | OCC index for reference signal | | | CS index for reference signal | | |
|---|---|---|---|---|---|---|---|
| | | j = 0 | j = 1 | j = 2 | j = 0 | j = 1 | j = 2 |
| 0 | 0 | 0 | 0 | 1 | 0 | 8 | 5 |
| 1 | 1 | 0 | 0 | 1 | 2 | 10 | 7 |
| 2 | 2 | 0 | 1 | 1 | 4 | 1 | 9 |
| 3 | 3 | 0 | 1 | 1 | 6 | 3 | 11 |

(51) Int. Cl.
*H04L 5/00* (2006.01)
*H04L 25/03* (2006.01)

(52) U.S. Cl.
CPC ...... *H04L 5/0023* (2013.01); *H04L 25/03866* (2013.01)

(56) References Cited

U.S. PATENT DOCUMENTS

| | | | | |
|---|---|---|---|---|
| 2009/0232065 | A1* | 9/2009 | Zhang | H04L 5/0091 370/329 |
| 2010/0067464 | A1 | 3/2010 | Higuchi | 370/329 |
| 2011/0038344 | A1* | 2/2011 | Chmiel | H04W 48/08 370/330 |
| 2011/0200018 | A1* | 8/2011 | Tazeh Mahalleh | H04L 5/001 370/336 |
| 2011/0235608 | A1* | 9/2011 | Koo et al. | 370/329 |
| 2012/0002568 | A1* | 1/2012 | Tiirola | H04L 1/0026 370/252 |
| 2012/0127932 | A1* | 5/2012 | Gao | H04L 5/0035 370/329 |
| 2012/0140724 | A1* | 6/2012 | Sipola | H04L 1/1607 370/329 |
| 2012/0263124 | A1* | 10/2012 | Gaal et al. | 370/329 |
| 2012/0275409 | A1* | 11/2012 | Han | H04L 1/0007 370/329 |

FOREIGN PATENT DOCUMENTS

| | | |
|---|---|---|
| EP | 2139256 A1 * | 12/2009 |
| WO | WO 2009/120843 A2 | 10/2009 |

* cited by examiner

| Cyclic Shift | DMRS OCC index | |
|---|---|---|
| | 0 | 1 |
| 0 | Cell #0 & UE #0 | |
| 1 | | Cell #1 & UE#0 |
| 2 | Cell #0 & UE #1 | |
| 3 | | Cell #1 & UE#3 |
| 4 | Cell # 0 & UE #2 | |
| 5 | | Cell # 2 & UE #2 |
| 6 | Cell # 0 & UE #3 | |
| 7 | | Cell # 2 & UE #0 |
| 8 | Cell # 1 & UE #1 | |
| 9 | | Cell # 2 & UE #3 |
| 10 | Cell # 1 & UE #2 | |
| 11 | | Cell # 2 & UE #1 |

Fig. 5

| DATA OCC Index | | | |
|---|---|---|---|
| 0 | 1 | 2 | 3 |
| UE #0 | UE #1 | UE #2 | UE #3 |

Fig. 6

| Data OCC Index | | | |
|---|---|---|---|
| 0 | 1 | 2 | 3 |
| Cell#0 & UE#0 | Cell#0 & UE#1 | | |
| | | Cell#1 & UE#0 | Cell#1 & UE#1 |
| Cell#2 & UE#0 | Cell#2& UE#1 | Cell#2 & UE#2 | Cell#2 & UE#3 |

Fig. 7

| Data OCC Index | | | |
|---|---|---|---|
| 0 | 1 | 2 | 3 |
| Cell#0 & UE#0 | Cell#0 & UE#1 | Cell#0 & UE#2 | Cell#0 & UE#3 |
| Cell#1 & UE#0 | Cell#1 & UE#1 | Cell#1 & UE#2 | Cell#1 & UE#3 |
| Cell#2 & UE#0 | Cell#2& UE#1 | Cell#2 & UE#2 | Cell#2 & UE#3 |

Fig. 8

| Allocation index i | OCC index for data communication | OCC index for reference signal | | | CS index for reference signal | | |
|---|---|---|---|---|---|---|---|
| | | j = 0 | j = 1 | j = 2 | j = 0 | j = 1 | j = 2 |
| 0 | 0 | 0 | 0 | 1 | 0 | 8 | 5 |
| 1 | 1 | 0 | 0 | 1 | 2 | 10 | 7 |
| 2 | 2 | 0 | 1 | 1 | 4 | 1 | 9 |
| 3 | 3 | 0 | 1 | 1 | 6 | 3 | 11 |

Fig. 9

RESOURCE ALLOCATION IN A WIRELESS COMMUNICATION SYSTEM

TECHNICAL FIELD

This disclosure relates to resource allocation in a communication system and more particularly, but not exclusively, to allocation of resources for data communications and related signalling such as reference signalling.

BACKGROUND

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. In a wireless communication system at least a part of the communication between at least two stations occurs over a wireless interface between at least two stations. Examples of wireless systems include public land mobile networks (PLMN) such as cellular networks, satellite based communication systems and different wireless local networks, for example wireless local area networks (WLAN). A wireless system can be divided into radio service areas such as cells. Hence the wireless systems are often referred to as cellular systems. A radio service area is typically provided by a base station. Radio service areas such as cells can have different shapes and sizes, and can also be divided into sectors.

A user can access the communication system by means of an appropriate communication device. Typically a communication device is used for enabling receiving and transmission of user data such as speech and content data. In wireless systems a communication device provides a transceiver station that can communicate with another communication device such as e.g. base stations of access networks and/or other user equipments. A communication device of a user is often referred to as user equipment (UE) or terminal. A communication device is provided with an appropriate signal receiving and transmitting arrangement for enabling communication of data and signalling with other parties.

In addition to user data, various signalling information can be sent between the communicating devices, for example between a base station and mobile communication devices. For example, reference signals can be sent from mobile devices to base stations and vice versa.

Neighbouring radio service areas typically overlap, and thus e.g. a communication device in a cell can receive from and transmit to more than one base station. This means also that communications in a cell can interfere with communications in another cell or other radio service area.

An example of wireless communication systems is an architecture that is being standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

An interference rejection combining (IRC) receiver is considered a promising enhancement for LTE because of relatively high gain, especially for cell edge user equipments and low implementation complexity. An IRC receiver calculates and applies a set of antenna weights in the receiver to maximize the received signal to interference-plus-noise ratio (SINR) taking into account the spatial characteristics of interfering signals. An IRC receiver can be used to suppress inter-cell interference in particular. The capability of an IRC receiver is, however, dependent on the number of interfering signals and on the number of receive antennas.

On a channel such as a physical uplink shared channel (PUSCH) channel the IRC receiver is showing promising possibilities because there is typically only one interfering signal per cell due to frequency division multiplexing (FDM) separation between the user equipments. However, this may not be the case in other channels. For example, the situation on physical uplink control channel (PUCCH) is different because a signal can experience multiple interfering signals. The interferers may come from a single or a plurality of neighbouring cell. Multiple user equipments can be allocated in a PUCCH to a physical resource block (PRB), the different user equipments within one PRB being separated by different cyclic shift of cell specific zero autocorrelation (ZAC) sequences and/or different blockwise spreading codes. However, the arrangement makes the PUCCH vulnerable for interference from other user equipments.

It is possible to randomise signals from other cells by means of cell specific zero autocorrelation (ZAC) base sequence hopping and cell specific cyclic shift hopping. These may be used for PUCCH Formats 1, 2 and 3 in accordance with the 3GPP standard, the different PUCCH formats defining how control information is carried on the channel. Additionally, if communication of data is blockwise spread into a multiple of symbols, for example single carrier frequency division multiple access (SC-FDMA) symbols, the data can be cyclically or circularly shifted between the symbols according to a cell specific data hopping pattern. This can, for example, be used for PUCCH format 3 SC-FDMA symbols that are not used for reference signalling. A drawback of randomization is the possibility for high number of interfering signals. This, in turn, can mean that there is no capacity, or degrees of freedom in the spatial domain, for advanced receivers like those employing interference rejection combining (IRC) on PUCCH. Therefore PUCCH performance (e.g. coverage, capacity) can become interference limited due to a number of interfering signals from multiple user equipments allocated to the same PRB resources in adjacent cells. This can mean that there is no benefit from an advanced receiver on a PUCCH. Frequency or code domain frequency reuse can be applied for a PUCCH to address the issue, but this can increase the PUCCH overhead. For example, with reuse of ⅓, PUCCH overhead can increase by three times.

It is noted that the above discusses only examples, and the issues are not limited to any particular communication system, standard, specification, channels and so forth, but may occur in any communication system where information may be communicated by a plurality of devices on limited resources.

Embodiments of the invention aim to address one or several of the above issues.

SUMMARY

In accordance with an embodiment there is provided a method for allocating resources for wireless communication comprising allocating orthogonal resources for signalling within a coordination area comprising at least two radio service areas based on a first resource pattern, and allocating orthogonal data communication resources within a radio service area of the coordination area based on a second resource pattern.

In accordance with another embodiment there is provided a method for using resources for wireless communication comprising receiving signalling indicating an allocation of orthogonal resources for signalling within a coordination area comprising at least two radio service areas based on a first resource pattern and an allocation of orthogonal data communication resources within a radio service area of the coordination area based on a second resource pattern, and transmitting signalling on the allocated signalling resources orthogonal within the coordination area and data on the allocated data communication resources orthogonal within the radio service area.

In accordance with another embodiment there is provided an apparatus for allocating resources for wireless communication, the apparatus comprising at least one processor, and at least one memory including computer program code, wherein the at least one memory and the computer program code are configured, with the at least one processor, to allocate orthogonal resources for signalling within a coordination area comprising at least two radio service areas based on a first resource pattern and to allocate orthogonal data communication resources within a radio service area of the coordination area based on a second resource pattern.

In accordance with yet another embodiment there is provided an apparatus for controlling use of resources for wireless communication, the apparatus comprising at least one processor, and at least one memory including computer program code, wherein the at least one memory and the computer program code are configured, with the at least one processor, to process received indication of an allocation of orthogonal resources for signalling within a coordination area comprising at least two radio service areas based on a first resource pattern and of an allocation of orthogonal data communication resources within a radio service area of the coordination area based on a second resource pattern, and to cause transmission of signalling on the allocated signalling resources orthogonal within the coordination area and data on the allocated data communication resources orthogonal within the radio service area.

In accordance with a more detailed embodiment resources for reference signals are allocated. Allocation of resources may comprises allocation of at least one of code division multiplexing resources, time division multiplexing resources, frequency division multiplexing resources and space division multiplexing resources.

Configuring of the first pattern may comprise configuring at least one of a data hopping pattern, a cyclic shift hopping pattern and a base sequence group hopping pattern to be same on at least two radio service areas.

Allocation of data communication resources may comprise allocation of orthogonal resources in each radio service area of the coordination area. Same data communications resources may be allocated for communication devices in at least two radio service areas of the coordination area. More orthogonal recourses may have been made available for allocation of signalling resources in the coordination area than for data communications. At least one resource can be associated with a communication device and a radio service area. The at least one resource may be tied with an index of the radio service area.

Resources can be divided between the at least two radio service areas of the coordination area and then allocated based on the division.

Randomizing may be provided between a plurality of coordination areas. The randomization may be provided by using at least one of a coordination area specific sequence group hopping pattern, a coordination area specific data hopping pattern and a coordination area specific cyclic shift hopping pattern.

A communication device and/or base station comprising a control apparatus configured to provide at least one of the embodiments can also be provided. The communication device may comprise a user equipment, for example a mobile station.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

BRIEF DESCRIPTION OF THE DRAWINGS

The invention will now be described in further detail, by way of example only, with reference to the following examples and accompanying drawings, in which:

FIG. 5 shows an example of a signalling resource pattern;

FIGS. 6 to 8 show examples of data resource patterns; and

FIG. 9 shows an example of a resource allocation notation.

DETAILED DESCRIPTION

In the following certain exemplifying embodiments are explained with reference to a wireless or mobile communication system serving mobile communication devices. Therefore, before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
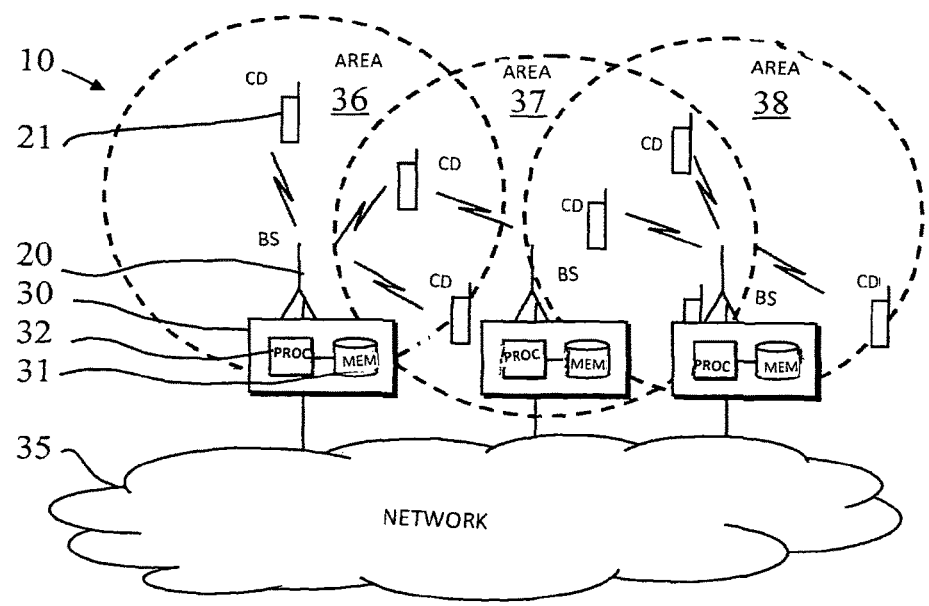
FIG. 1 shows an example of a communication system wherein below described examples of the invention may be implemented.

A mobile communication device 21 is typically provided wireless access via at least one base station or similar wireless, transceiver node of an access system. An access system may be provided by a cell of a cellular system or another system enabling a communication device (CD) to access a communication system. Therefore an access system is hereinafter referred to as a radio service area or cell. In FIG. 1 three neighbouring radio service areas (AREA) 36, 37 and 38 are shown being provided by base stations (BS) 20. However, it is noted that instead of three radio service areas, any number of radio service areas may be provided in a communication system. A base station site 20 can provide one or more cells. A base station can also provide a plurality of sectors, for example three radio sectors, each sector providing a cell or a sub radio service area of a cell.

The cell borders or edges are schematically shown for illustration purposes only by the dashed lines in FIG. 1. It shall be understood that the sizes and shapes of the cells or other radio service areas may vary considerably from the similarly sized omni-directional shapes of FIG. 1. As shown, the radio service areas can overlap. Thus signals transmitted in an area can interfere with communications in another area.

A base station 20 is typically controlled by at least one appropriate controller so as to enable operation thereof and management of mobile communication devices 21 in communication with the base station. The control apparatus can be interconnected with other control entities. In FIG. 1 a controller apparatus is shown to be provided by block 30. A base station control apparatus is typically provided with memory capacity (MEM) 31 and at least one data processor (PROC) 32. The control apparatus and functions may be distributed between a plurality of control units.

A non-limiting example of communication systems is the long-term evolution (LTE) of the Universal Mobile Telecommunications System (UMTS) that is being standardized by the 3rd Generation Partnership Project (3GPP). As explained above, further development of the LTE is referred to as LTE-Advanced. A LTE base station is known as NodeB (NB) in the vocabulary of the 3GPP specifications. The LTE based systems can employ a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio service include those provided by base stations of systems that are based on technologies such as wireless local area network (WLAN) and/or WiMax (Worldwide Interoperability for Microwave Access).

In FIG. 1 example the base stations are connected to a wider communications network (NETWORK) 35. A controller may be provided for coordinating the operation of the access systems. A gateway function may also be provided to connect to another network via the network 35. The other network may be any appropriate network. A wider communication system may thus be provided by one or more interconnect networks and the elements thereof, and one or more gateways may be provided for interconnecting various networks.

Figure 2:
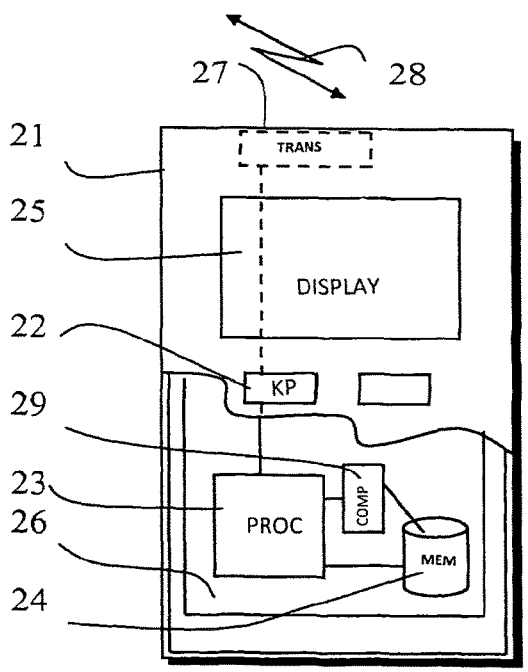
FIG. 2 shows an example of a communication device.

FIG. 2 shows a schematic, partially sectioned view of a communication device (CD) 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device (CD) 21 may receive and transmit signals over an air interface 28 via appropriate apparatus for receiving and transmitting signals. In FIG. 2 transceiver (TRANS) apparatus is designated schematically by block 27. The transceiver (TRANS) may be provided for example by means of a radio part and associated antenna arrangement. The antenna arrangement may be arranged internally or externally to the mobile device. A wireless communication device can be provided with a Multiple Input/Multiple Output (MIMO) antenna system.

A mobile device is also typically provided with at least one data processing entity (PROC) 23, at least one memory (MEM) 24 and other possible components (COMP) 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Possible control functions in view of configuring the mobile communication device for reception and/or transmission of signalling information and data by means of the data processing facility in accordance with certain embodiments of the present invention will be described later in this description.

The user may control the operation of the mobile device by means of a suitable user interface such as key pad (KP) 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

Figure 3:
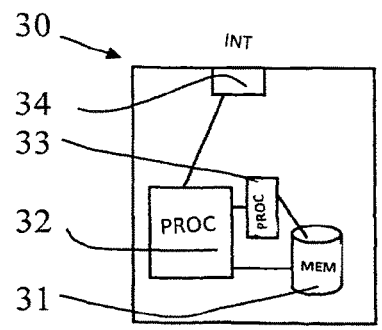
FIG. 3 shows an example of controller apparatus for a base station.

FIG. 3 shows an example of a control apparatus 30 for a communication system, for example to be coupled to and/or for controlling a station of a radio service area. The control apparatus 30 can be arranged to provide control on communications by mobile communication devices that are in the service area. The control apparatus 30 can be configured to provide control functions in association with generation and communication of allocation information and other related information and for coordination of resource allocation for signalling and data communications by means of the data processing facility in accordance with certain embodiments described below. For this purpose the control apparatus 30 comprises at least one memory (MEM) 31, at least one data processing unit (PROC) 32, 33 and an input/output interface (INT) 34. Via the interface the control apparatus can be coupled to receiver and transmitter apparatus of a base station. The control apparatus 30 can be configured to execute an appropriate software code to provide the control functions.

The required data processing apparatus and functions of a base station apparatus, a communication device and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In accordance with an aspect one or more coordination areas are defined. A coordination area comprises at least two radio service areas. In the example of FIG. 1 the three cells 36, 37 and 38 can form a coordination area 10. Definition of coordination areas can be either static or semi-static. Coordination areas can be defined, for example at the time of system set-up, update or any modification. For example, a coordination area may be defined during network deployment, by a network operation & maintenance entity or a corresponding network element, or by other element controlling configuration of a set of cells. Such element can be for example an eNB of LTE system or another element controlling a plurality of eNBs.

A coordination area may be defined based on an appropriate grouping of cells. For example, multiple neighboring cells can be connected to a single eNB. The cells can be different sectors provided by a single eNB site, or can supported with remote radio heads. In accordance with a possibility a large number of radio heads, each supporting a separate cell, are connected via optical fibre or another connection to a single site hosting computing elements for each of the cells. Such a site can also be configured to control the coordination and operation of the herein described resource allocation scheme.

The coordination of use of resources within the coordination area can be controlled, for example such that resources are statically or semi-statically divided to each base station of the coordination area. The division can be provided when the coordination area is defined or configured. Each base station can then have an independent control over the allocated resources, i.e. can allocate the resources given for its use to selected user equipment. Alternatively, all cells can be controlled by single network element, for example by a selected eNB or another base station of the coordination area.

Figure 4:
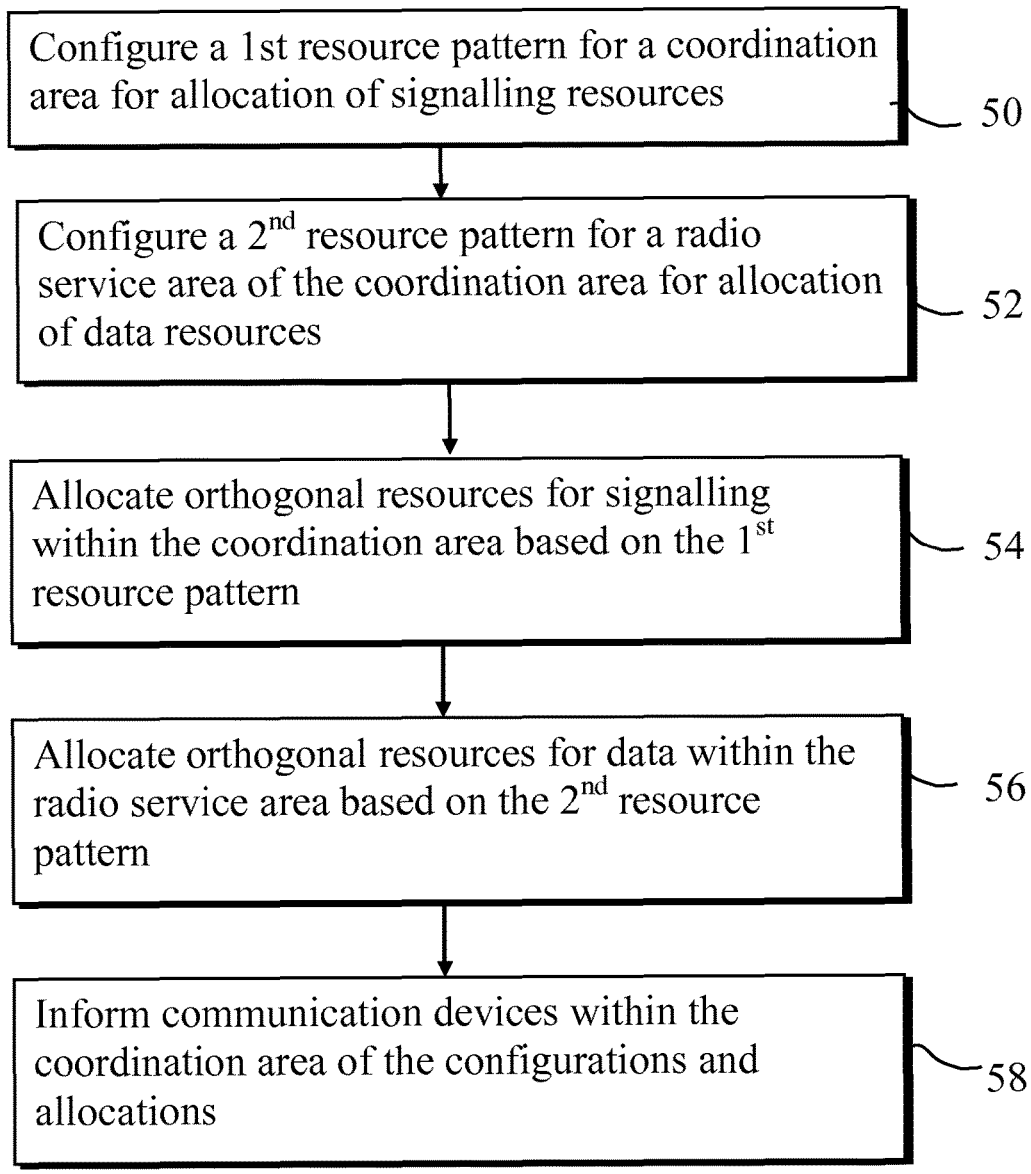
FIG. 4 is flowchart illustrating an embodiment.

In accordance with an embodiment different resource allocation methods can be used for reference signals and data signals. FIG. 4 illustrates an example of this. Information enabling reference signaling in a coordination area is generated and then communicated from base stations to mobile communication devices within the coordination area. The information can comprise information regarding signalling resource pattern or patterns that can be used for allocation of resources for communication devices within the coordination area.

In accordance with an embodiment a first resource pattern for the coordination area may be configured at 50 for use in allocation of resources for signalling. A second resource pattern for the coordination area may be generated at 52 for use in allocation of resources for data communication. A resource pattern can be described as a set of resources comprising appropriate combinations of available resource dimensions. The resource dimensions can contain orthogonal cover codes, cyclic shifts, frequency, time, and so on. A resource pattern can also be seen as providing a template for resource allocation. 'Examples of resource patterns are shown in FIGS. 5 to 8.

Orthogonal resources for signalling within the coordination area can then be allocated at 54 based on the first resource pattern. Data communication resources orthogonal within at least one radio service area of the coordination area can be allocated at 56 based on the second resource pattern.

The communication devices in the area receive information indicative of the allocation of the resources for signalling can then transmit signalling on the allocated signalling resources orthogonal within the coordination area and data on the allocated data communication resources orthogonal within the radio service area.

The resources for signalling can comprise resources for reference signals. The allocation can comprise allocation of code division multiplexing resources.

Instead of both patterns being provided for the entire coordination area, it is also possible to have different resource patterns for each cell. For example, a first pattern associated with signaling resources can be common for a coordination area and a second pattern associated with data communications can be used in each of the cells of the coordination area. A cell can use a subset of orthogonal cover codes (OCCs). Decisions regarding the use of the orthogonal cover codes can be made on a per cell basis. An example of a such pattern is shown in FIG. 7. FIG. 8 shows another example of a data pattern.

Information about the allocations is communicated at 58 to mobile communication devices within the coordination area. It is noted that it can be sufficient to communicate information of allocation per a communication device only. The communication devices can then be operated accordingly so that orthogonal resources are used for signaling within the entire coordination area. Generally speaking, orthogonality of signals refers to signals that do not interfere with each other. For example, in frequency division multiplexing orthogonality typically refers to a set of frequency multiplexed signals with the minimum frequency spacing needed to make them orthogonal so that they do not interfere with each other and in code division multiplexing orthogonality typically refers to orthogonality between vectors representing data strings.

Data communication resources can be allocated differently and to be orthogonal on a per radio service area basis. Data resources can be assigned to the user equipments so that the assigned resources are mutually orthogonal within each cell, i.e. orthogonality is provided only per radio service area. Thus the orthogonality of allocated data communication resources is ensured only within a service area, e.g. a cell, and not over the entire coordination area as is the case with the signalling resources. Thus some user equipment in different cells of the coordination area can be assigned the same data signal resources.

The following presents a more detailed example relating to reference and data signal resource allocation supporting enhanced reception on a control channel. For example, in LTE uplink, reference signals can be used as demodulation reference signals (DM RS) on physical uplink control channels (PUCCH) and physical uplink shared channels (PUSCH). The reference signals can be used for channel estimation for coherent detection and demodulation. Coherent detection of signals can be utilized to mitigate the effect of interference. The reference signal provides a source of known symbols to facilitate the coherent detection, for example zero autocorrelation (ZAC) sequences.

The enhanced reception can be provided by means of a receiver configured to perform interference rejection combining (IRC). More particularly, a coordinated resource allocation method for signalling, for example reference signals, and data signals among pre-defined cells is described which allows inter-cell orthogonality for most of the user equipments within the coordination area and an efficient interference cancellation capability for remaining non-orthogonal user equipments. The principles can be applied on channels such as the physical uplink control channel (PUCCH) for coordinating reference signals and assigning resources.

Both data signals and reference signals of user equipments can be code division multiplexed over a coordination area containing multiple radio service areas. Definitions for related multiplexing resources (e.g. sequence group hopping pattern and cyclic shift hopping pattern) can be modified so that resources are orthogonal over multiple radio service areas. More orthogonal resources can be made available for the reference signals than for data signals. Each user equipment in the coordination area can be allocated with a unique reference signal resource. The unique reference signal resource is mutually orthogonal with other reference signal resources in the coordination area. This allows for relatively simple channel estimation in the base stations.

The herein described embodiments are also applicable to other multiplexing techniques. For example, time division multiplexing (TDM), frequency division multiplexing (FDM) and space division multiplexing (SDM) can be used for communications between different nodes of communication systems. For example, there are several ways to realize orthogonal reference signals in the case of code division multiplexed data signal, including CDM, FDM/IFDMA (Interleaved FDMA), a combination of CDM and FDM/IFDMA or a TDM.

When coordinating use of resources particular allocation patterns can be used for configuring the communication devices within a coordination area. Examples of appropriate patters comprise patterns that are conventionally used to mitigate inter-cell interference. These comprise pseudo-random hopping patterns or scrambling codes specific for a cell. In accordance with an embodiment hopping patterns are configured to be the same in all cells within the coordination area. For example, a data hopping pattern or cyclic shift hopping pattern and/or a base sequence group hopping pattern can be configured to be the same for user equipments within a coordination area. In accordance with another example, scrambling code on wideband code division multiple access (WCDMA) or high speed packet access (HSPA) systems can be configured to be the same for user equipments within a coordination area. Cyclic shifts can be used to multiplex reference signals from different user equipments within the coordination area. In cyclic shift hopping, applied on Format 1, 2 and on demodulation reference signal (DM RS) symbols of Format 3, a base sequence is cyclically (circularly) shifted from single carrier frequency division multiple access (SC-FDMA) symbol to SC-FDMA symbol. This sequence is modulated with data symbols when it is not used as a DM RS. In data hopping pattern, if used for data part of PUCCH Format 3, the sequence of data symbols forming single SC-FDMA symbol, is cyclically (circularly) shifted from SC-FDMA symbol to SC-FDMA symbol. Sequence group hopping in turn refers to hopping between sequences in different sequence groups, where the used sequence is selected in a pseudo-random way per slot.

When providing resource allocation inter-cell orthogonal reference signals within the coordination area can be configured such that reference signal resource or resources, for example cyclic shift index and/or orthogonal cover code index, are tied to an user equipment and a cell index. Tying to a respective cell can be provided when resources are divided and allocated to the cells, i.e. in step 50 of FIG. 4. The tying to a user equipment can be provided by a eNB of a cell. The resource tied to the cell and to a user equipment is then signalled by the eNB to the user equipment. Thus the configuration for the tying is provided by the network and the individual user equipments can then follow the tying instructions received from the network It is also possible that certain resources are indicated by a cell index in an appropriate technical specification. In that case, certain resources are allocated to a cell by configuration of the cell index.

The corresponding data signal resources can be configured using a different resource allocation method and based on a different data allocation pattern.

It is noted that the resource allocation can be realized in different ways. For example, a cell-specific connection between a data signal resource and a reference signal (RS) resource can be defined by a relevant standard. For example algebraic notation or a tabular notation may be used. In accordance with an example of algebraic notation an allocation index i is allocated and signalled to user equipment. Allocation index together with cell index can indicate reference signal and data communication resources as follows:

OCC index for data communication=$i$

OCC index for reference signal=$\lfloor (4(N_{ID}^{cell}) \mod 3+i)\Delta/12 \rfloor$ where floor operation is indicated with the special form of brackets and delta ($\Delta$) is a configurable cyclic shift offset.

Cyclic shift (CS) index for reference signal=$((4(N_{ID}^{cell}) \mod 3+i)\Delta) \mod 12 + \lfloor (4(N_{ID}^{cell}) \mod 3+i)\Delta/12 \rfloor$ Another example is where cell index is not used:

OCC index for data communication=$i \mod 4$

OCC index for reference signal=$\lfloor i\Delta/12 \rfloor$

CS index for reference signal=$(i\Delta) \mod 12 + \lfloor i\Delta/12 \rfloor$

Example on tabular notation is shown in FIG. 7. In the shown example $j=(N_{ID}^{cell}) \mod 3$.

In accordance with an additional embodiment the allocation index is extended so that it indicates also a PRB allocation.

A resource allocation scheme may also be such that data signal resources and reference signal resources can be configured separately and signalled to the user equipment by a eNB of a cell. This can be made e.g. as part of higher layer configuration of a corresponding signalling type.

The following gives an example for reference signal coordination stage and exemplary signalling thereof. Base station, for example an eNB signals information regarding PUCCH formats and/or physical resource blocks (PRBs) on which the coordination arrangement is applied to. The signalling may take place e.g. via higher layers or broadcasted system information. The eNB can also signal a new parameter related to sequence generation. This parameter can then be used in the calculation of sequence group hopping pattern and/or cyclic shift hopping pattern. The signalling thereof may also take place e.g. via higher layers or broadcasted system information.

In accordance with a particular example, eNB can signal new cell-specific offset parameter $$\Delta_{ss}^{PUCCH} \in \{0, 1, \ldots, 29\}$$

for PUCCH sequence shift pattern $f_{ss}^{PUCCH}$ so that $$f_{ss}^{PUCCH, mod} = (f_{ss}^{PUCCH} + \Delta_{ss}^{PUCCH}) \mod 30$$

is used in the determination of sequence group number $$u = (f_{gh}(n_s) + f_{ss}^{PUCCH, mod}) \mod 30.$$

For cyclic shift hopping pattern, pseudo-random sequence generator can be initialised to $$c_{init} = (N_{ID}^{cell} + \Delta_{ss}^{PUCCH}) \mod 30.$$

Cells in the coordination area can have physical cell identity (PCI) so that $$\left\lfloor \frac{N_{ID}^{cell}}{30} \right\rfloor$$

is constant for all cells.

An exemplary signalling resource allocation for PUCCH Format 3 between cells and user equipments is shown in FIG. 5 for demodulation reference signals (DMRS). FIGS. 6 to 8 show examples of data resource allocation between user equipments. In the shown examples it is assumed that a coordination area consists of three cells and there are four PUCCH Format 3 user equipments per cell. It is noted that although not all standards and versions thereof, for example release 10 of the LTE specifications, use orthogonal cover codes (OCC) between the reference signal blocks this can be provided relatively easily in a coordinated deployment.

A benefit of the herein described arrangement is that within the coordinated area, the data signal by each user equipment experiences interference only from a limited number of user equipments. The interference can be cancelled in the receiver as the interfering channels are known, and can be easily estimated based on reference signals orthogonal within the coordination area. For example, reception of data signal from UE #0 in Cell #0 is interfered by only one data signal interferer per cell (UE #0 in Cell #1 and UE #0 in Cell #2) while other user equipments within the coordination area are orthogonal. The easy cancellation of the interference originating from the same coordination area is achieved because the reference signals of desired signal and interfering signals are made mutually orthogonal. This allows for easy estimation of interfering channels and, consecutively, interference cancellation.

Randomization between multiple coordination areas can also be provided. This can be carried out by using at least one of the coordination area specific zero autocorrelation (ZAC) base sequence group hopping pattern (PUCCH Format 1 and Format 2) and coordination area specific data hopping pattern or cyclic shift hopping pattern (PUCCH Format 1, 2 and 3).

An appropriately adapted computer program code product or products may be used for implementing the embodiments, when loaded or otherwise provided on an appropriate data processing apparatus, for example for causing determinations of appropriate signalling and data communications patterns configurations and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The above described embodiments may provide various advantages. For example, improved control channel, for example PUCCH, performance may be achieved. This can result increased payload and/or increased coverage.

It is noted that whilst embodiments have been described in relation to communications system such as those based on the LTE-Advanced (LTE-A) systems, e.g. LTE Release 10 and Release 11 and beyond and 3GPP based systems and with relation to uplink signalling on the PUCCH, similar principles can be applied to other communication systems and control channels where reference signals are used. Non-limiting examples of other communication systems include those based on the WCDMA and HSPA. Thus, instead of communications between communication devices such as a user equipment and base stations the communications may be provided in different scenarios such as in communications taking place directly between two or more user equipments. For example, this may be the case in application where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the spirit and scope of the present invention.

The invention claimed is:

1. A method comprising:
    allocating, by a network device, resources for wireless communication comprising:
    allocating, by the network device, orthogonal resources for signaling within a coordination area comprising at least two radio cells based on a first resource pattern, wherein the resource allocation based on the first resource pattern within the coordination area comprises tying reference signal resources to a user equipment and a cell index, and requires that at least one of a data hopping pattern, a cyclic shift hopping pattern, and a base sequence group hopping pattern are configured to be a same in radio cells of the coordination area; and
    allocating, by the network device, orthogonal data communication resources within a radio cell of the at least two radio cells of the coordination area based on a second resource pattern, wherein orthogonality of the allocated data communication resources is ensured only within the radio cell and not over the entire coordination area, and wherein the resource allocation based on the second resource pattern follows a different allocation method than the resource allocation based on the first resource pattern.

2. A method comprising:
using, by a communication device, resources for wireless communication comprising:
receiving signaling indicating an allocation of orthogonal resources for signaling within a coordination area comprising at least two radio cells based on a first resource pattern, wherein resource allocation based on the first resource pattern within the coordination area comprises tying reference signal resources to a user equipment and a cell index, and requires that at least one of a data hopping pattern, a cyclic shift hopping pattern and a base sequence group hopping pattern are configured to be a same in radio cells of the coordination area;
receiving, by the communication device, an allocation of orthogonal data communication resources within a radio cell of the at least two radio cells of the coordination area based on a second resource pattern, wherein orthogonality of the allocated data communication resources is ensured only within the radio cell and not over the entire coordination area, and wherein the resource allocation based on the second resource pattern follows a different allocation method than the resource allocation based on the first resource pattern; and
transmitting, by the communication device, signaling on the allocated signaling resources orthogonal within the coordination area and data on the allocated data communication resources orthogonal within the radio cell.

3. The method as claimed in claim 1, wherein allocation of resources for signalling comprises allocation of resources for reference signals.

4. The method as claimed in claim 1, wherein allocation of resources for at least one of signaling and data communications comprises allocation of at least one of code division multiplexing resources, time division multiplexing resources, frequency division multiplexing resources and space division multiplexing resources.

5. The method as claimed in claim 1, comprising:
configuring the first resource pattern for use in allocation of resources for signaling in the coordination area; and
configuring the second resource pattern for use in allocation of resources for data communication within at least one radio cell of the coordination area.

6. The method as claimed in claim 1, wherein allocation of data communication resources comprises allocating orthogonal resources in each radio cell of the coordination area.

7. The method as claimed in claim 1, comprising allocating same data communications resources for communication devices in at least two radio cells of the coordination area.

8. The method as claimed in claim 1, wherein more orthogonal resources are available for allocation of resources for signaling in the coordination area than for data communications.

9. The method as claimed in claim 1, wherein the tying reference signal resources to the user equipment and the cell index comprises the reference signal resources are associated with the user equipment by configuration of the cell index.

10. The method as claimed in claim 1, wherein the resources comprise at least an orthogonal cover code index.

11. The method as claimed in claim 1, comprising dividing resources between the at least two radio cells of the coordination area and allocating resources based on the division.

12. The method as claimed in claim 1, comprising allocating the resources for a radio cell by a controller apparatus of that radio cell.

13. The method as claimed in claim 1, comprising allocating the resources for at least two radio cells by a common controller apparatus.

14. The method as claimed in claim 1, comprising randomizing between a plurality of coordination areas by using at least one of a coordination area specific sequence group hopping pattern, a coordination area specific data hopping pattern and a coordination area specific cyclic shift hopping pattern.

15. The method as claimed in claim 1, wherein a multiple of communication devices are allocated on a physical resource block on a control channel.

16. The method as claimed in claim 1, comprising allocating resources for signalling on a physical uplink control channel.

17. The method as claimed in claim 1, comprising signalling from at least one radio cell information regarding at least one of channel formats and relevant physical resource blocks.

18. The method as claimed in claim 1, comprising signaling in at least one radio cell information regarding sequence generation for use in calculation of at least one of the first pattern and the second pattern.

19. The method as claimed in claim 18, comprising signaling a radio cell specific offset for a sequence shift pattern.

20. The method as claimed in claim 1, comprising interference rejection combining in reception of signaling within the coordination area.

21. An apparatus comprising:
at least one processor, and
at least one memory including computer program code, wherein the at least one memory and the computer program code are configured, with the at least one processor, to cause the apparatus to perform:
allocating resources for wireless communication, comprising:
allocating orthogonal resources for signaling within a coordination area comprising at least two radio cells based on a first resource pattern, wherein resource allocation based on the first resource pattern within the coordination area comprises tying reference signal resources to a user equipment and a cell index, and requires that at least one of a data hopping pattern, a cyclic shift hopping pattern and a base sequence group hopping pattern are configured to be a same in radio cells of the coordination area; and
allocating orthogonal data communication resources within a radio cell of the at least two radio cells of the coordination area based on a second resource pattern, wherein orthogonality of the allocated data communication resources is ensured only within the radio cell and not over the entire coordination area, and wherein the resource allocation based on the second resource pattern follows a different allocation method than the resource allocation based on the first resource pattern.

22. An apparatus comprising:
at least one processor, and
at least one memory including computer program code, wherein the at least one memory and the computer program code are configured, with the at least one processor, to cause the apparatus to:

controlling use of resources for wireless communication, comprising:

processing received indication of an allocation of orthogonal resources for signaling within a coordination area comprising at least two radio cells based on a first resource pattern, wherein resource allocation based on the first resource pattern within the coordination area comprises tying reference signal resources to a user equipment and a cell index, and requires that at least one of a data hopping pattern, a cyclic shift hopping pattern and a base sequence group hopping pattern are configured to be a same in radio cells of the coordination area;

process an indication of an allocation of orthogonal data communication resources within a radio cell of the at least two radio cells of the coordination area based on a second resource pattern, wherein orthogonality of the allocated data communication resources is ensured only within the radio cell and not over the entire coordination area, and wherein the resource allocation based on the second resource pattern follows a different allocation method than the resource allocation based on the first resource pattern; and causing transmission of signaling on the allocated signaling resources orthogonal within the coordination area and data on the allocated data communication resources orthogonal within the radio cell.

23. The apparatus as claimed in claim 21, wherein allocation of resources for signaling comprises allocation of resources for reference signals.

24. The apparatus as claimed in claim 21, wherein allocation of resources for at least one of signaling and data communications comprises allocation of at least one of code division multiplexing resources, time division multiplexing resources, frequency division multiplexing resources and space division multiplexing resources.

25. The apparatus as claimed in claim 21, wherein the at least one memory including the computer program code is configured with the at least one processor to cause the apparatus to:

configure the first resource pattern for use in allocation of resources for signaling in the coordination area and to configure the second resource pattern for use in allocation of resources for data communication within at least one radio cell of the at least two radio cells of the coordination area.

26. The apparatus as claimed in claim 21, wherein the at least one memory including the computer program code is configured with the at least one processor to cause the apparatus to:

allocate orthogonal resources in each radio cell of the coordination area.

27. The apparatus as claimed in claim 21, wherein the at least one memory including the computer program code is configured with the at least one processor to cause the apparatus to:

allocate same data communications resources for communication devices in at least two radio cells of the coordination area.

28. The apparatus as claimed in claim 21, wherein the at least one memory including the computer program code is configured with the at least one processor to cause the apparatus to:

associate at least one resource with a communication device and a radio cell.

29. The apparatus as claimed in claim 21, wherein the resources comprise at least an orthogonal cover code index.

30. The apparatus as claimed in claim 21, wherein the at least one memory including the computer program code is configured with the at least one processor to cause the apparatus to:

divide resources between the at least two radio cells of the coordination area and to allocate resources based on the division.

31. The apparatus as claimed in claim 21, comprising a controller apparatus of the radio cell.

32. The apparatus as claimed in claim 21, wherein the at least one memory including the computer program code is configured with the at least one processor to cause the apparatus to: allocate resources for at least two radio cells.

33. The apparatus as claimed in claim 21, wherein the at least one memory including the computer program code is configured with the at least one processor to cause the apparatus to: randomize between a plurality of coordination areas by using at least one of a coordination area specific sequence group hopping pattern, a coordination area specific data hopping pattern and a coordination area specific cyclic shift hopping pattern.

34. The apparatus as claimed in claim 21, wherein a multiple of communication devices is allocated on a physical resource block on a control channel.

35. The apparatus as claimed in claim 21, wherein the resources for signaling comprises resources on a physical uplink control channel.

36. The apparatus as claimed in claim 21, wherein the at least one memory including the computer program code is configured with the at least one processor to cause the apparatus to: cause signaling information regarding at least one of channel formats and relevant physical resource blocks.

37. The apparatus as claimed in claim 21, wherein the at least one memory including the computer program code is configured with the at least one processor to cause the apparatus to: cause signaling information regarding sequence generation for use in calculation of at least one of the first pattern and the second pattern.

38. The apparatus as claimed in claim 37, wherein the at least one memory including the computer program code is configured with the at least one processor to cause the apparatus to: cause signaling of a radio cell specific offset for a sequence shift pattern.

39. A device for a communication system comprising an apparatus in accordance with claim 21.

40. The device as claimed in claim 39, comprising a base station or mobile user equipment.

41. A computer program comprising program code stored on a non-transitory memory, the program code executed by at least one processor to perform the steps method of claim 1.

42. A communication system comprising an apparatus or a device in accordance with claim 21.

* * * * *